US012631781B2

(12) United States Patent
Wu et al.

(10) Patent No.: US 12,631,781 B2
(45) Date of Patent: May 19, 2026

(54) FRACTURE DETERMINATION AHEAD OF THE TOOL

(71) Applicant: Halliburton Energy Services, Inc., Houston, TX (US)

(72) Inventors: Hsu-Hsiang Wu, Houston, TX (US); Jin Ma, Houston, TX (US); Yi Jing Fan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 134 days.

(21) Appl. No.: 18/397,859

(22) Filed: Dec. 27, 2023

(65) Prior Publication Data

US 2024/0219600 A1 Jul. 4, 2024

Related U.S. Application Data

(60) Provisional application No. 63/436,060, filed on Dec. 29, 2022.

(51) Int. Cl.
*G01V 3/28* (2006.01)
*E21B 49/00* (2006.01)
(52) U.S. Cl.
CPC ................ *G01V 3/28* (2013.01); *E21B 49/00* (2013.01)
(58) Field of Classification Search
CPC . E21B 49/00; G01V 3/18; G01V 3/26; G01V 3/34; G01V 3/40; G01V 3/083; G01V 3/12; G01V 3/30; G01V 3/28
USPC .................................. 324/346, 351, 337, 339
See application file for complete search history.

(56) References Cited

U.S. PATENT DOCUMENTS

| | | | |
|---|---|---|---|
| 8,860,416 B2 * | 10/2014 | Bittar | G01V 3/28 |
| | | | 324/338 |
| 10,167,713 B2 | 1/2019 | Ma et al. | |
| 10,436,931 B2 | 10/2019 | Pan et al. | |
| 10,962,676 B2 | 3/2021 | Ma et al. | |
| 10,989,044 B2 | 4/2021 | Ma et al. | |
| 10,996,368 B2 | 5/2021 | Dong et al. | |
| 11,111,776 B2 | 9/2021 | Fan et al. | |
| 11,118,441 B2 | 9/2021 | Ma et al. | |
| 11,143,023 B2 | 10/2021 | Ma et al. | |

(Continued)

OTHER PUBLICATIONS

Halliburton, EarthStar Ultra-Deep Resistivity service, Data Sheet, Mar. 7, 2023. H013109.

(Continued)

*Primary Examiner* — Roberto Velez
(74) *Attorney, Agent, or Firm* — Benjamin Ford; C. Tumey Law Group PLLC

(57) ABSTRACT

A method and/or system comprising: disposing a bottom hole assembly into a wellbore, wherein the bottom hole assembly comprises: a transmitter sub comprising a transmitter coil; a first receiver sub comprising a first receiver coil; transmitting an electromagnetic wave into a subterranean formation with the transmitter coil; receiving a plurality of response signals with the first receiver coil, wherein the plurality of response signals are from two or more depths and are formed from the electromagnetic wave interacting with the subterranean formation. Additionally, the method and/or system may be configured to analyze a gradient of the response signals to determine if the gradient exceeds a threshold, wherein the threshold indicates a presence of a fracture or fault.

20 Claims, 7 Drawing Sheets

(56) References Cited

U.S. PATENT DOCUMENTS

| | | | |
|---|---|---|---|
| 11,174,727 | B2 | 11/2021 | Bittar et al. |
| 11,299,978 | B2 | 4/2022 | Song et al. |
| 11,320,560 | B2 | 5/2022 | Wilson et al. |
| 11,339,650 | B2 | 5/2022 | Bittar et al. |
| 11,391,859 | B2 | 7/2022 | Pan et al. |
| 11,402,533 | B2 | 8/2022 | Wu et al. |
| 11,434,750 | B2 | 9/2022 | Wu et al. |
| 11,448,795 | B2 | 9/2022 | Ma |
| 11,459,868 | B2 | 10/2022 | Fan et al. |
| 11,459,870 | B2 | 10/2022 | Ma et al. |
| 11,467,312 | B2 | 10/2022 | Pan et al. |
| 11,467,318 | B2 | 10/2022 | Wu et al. |
| 11,520,071 | B2 | 12/2022 | Wu et al. |
| 11,543,552 | B2 | 1/2023 | Wu et al. |
| 11,543,558 | B1 | 1/2023 | Wu et al. |
| 11,674,378 | B2 | 6/2023 | Bittar et al. |
| 11,680,479 | B2 | 6/2023 | Fan et al. |
| 11,703,610 | B2 | 7/2023 | Ma |
| 2011/0133740 | A1 | 6/2011 | Seydoux et al. |
| 2016/0047239 | A1 | 2/2016 | Hou et al. |
| 2016/0124108 | A1 | 5/2016 | Wu |
| 2016/0282502 | A1 | 9/2016 | Sharma et al. |
| 2016/0282512 | A1 | 9/2016 | Donderici et al. |
| 2016/0341842 | A1* | 11/2016 | Bammi .................... G01V 1/48 |
| 2018/0371893 | A1 | 12/2018 | Ma et al. |
| 2019/0093470 | A1 | 3/2019 | Ma et al. |
| 2020/0240261 | A1 | 7/2020 | Wu et al. |
| 2020/0300084 | A1 | 9/2020 | Bittar et al. |
| 2020/0309984 | A1 | 10/2020 | Pan et al. |
| 2020/0378247 | A1 | 12/2020 | Ma et al. |
| 2021/0047921 | A1 | 2/2021 | Bittar et al. |
| 2021/0055447 | A1 | 2/2021 | Dong et al. |
| 2021/0079785 | A1 | 3/2021 | Fan et al. |
| 2021/0190987 | A1 | 6/2021 | Wu et al. |
| 2021/0208302 | A1 | 7/2021 | Ma et al. |
| 2021/0356621 | A1 | 11/2021 | Wu et al. |
| 2021/0363870 | A1 | 11/2021 | Fan et al. |
| 2021/0363876 | A1 | 11/2021 | Fan et al. |
| 2021/0405240 | A1 | 12/2021 | Ma |
| 2022/0025763 | A1 | 1/2022 | Bittar et al. |
| 2022/0065095 | A1* | 3/2022 | Kwak ...................... G01V 3/32 |
| 2022/0137251 | A1* | 5/2022 | Pan .......................... G01V 3/38 |
| | | | 702/7 |
| 2022/0397695 | A1 | 12/2022 | Ma et al. |
| 2022/0404520 | A1 | 12/2022 | Ma et al. |
| 2022/0413179 | A1 | 12/2022 | Ma |
| 2023/0145563 | A1 | 5/2023 | Pan et al. |
| 2023/0214548 | A1 | 7/2023 | Pan et al. |

OTHER PUBLICATIONS

Halliburton, BrightStar Look-Ahead Resistivity Service, Sep. 22, 2022, H014348.
International Search Report and Written Opinion for International Patent Application No. PCT/US2023/086277 dated May 14, 2024. PDF file. 11 pages.

* cited by examiner

FRACTURE DETERMINATION AHEAD OF THE TOOL

CROSS REFERENCE TO RELATED APPLICATIONS

This application claims the priority of U.S. Provisional Patent Application No. 63/436,060, filed Dec. 29, 2022, which is incorporated by reference in its entirety.

BACKGROUND

Modern petroleum drilling and production operations may demand a great quantity of information relating to the parameters and conditions downhole. Such information typically includes the location and orientation of the borehole and drilling assembly, earth formation properties, and parameters of the downhole drilling environment. The collection of information relating to formation properties and downhole conditions is commonly referred to as logging and can be performed during the drilling process itself (hence the term "logging while drilling" or "LWD," frequently used interchangeably with the term "measurement while drilling" or "MWD").

When plotted as a function of depth or tool position in the borehole, the logging tool measurements are termed "logs." Resistivity logging may be used in well logging to determine geological correlation of formation strata and detect and quantify potentially productive formation zones. Such logs may provide indications of hydrocarbon concentrations and other information useful to drillers and completion engineers. In particular, azimuthally-sensitive logs may provide information useful for steering the drilling assembly because they can inform the driller when a target formation bed has been entered or exited, thereby enabling modifications to the drilling program that will provide much more value and higher success than would be the case using only seismic data.

During drilling operations used for the exploration of hydrocarbons, it may be desirable to detect and circumnavigate fractures located in the subterranean formation. Subterranean fractures may be naturally occurring or man-made. For example, natural faults, fractures, and fissures may form in the subterranean formation as a natural response to subterranean stress, while hydraulic fracturing (e.g., hydraulic fracturing operations used by the energy industry to improve hydrocarbon production) may create man-made fracture networks in the subterranean formation. It may be desirable to avoid transecting subterranean fractures with a wellbore for production optimization, safety, and operational optimization purposes.

BRIEF DESCRIPTION OF THE DRAWINGS

The features and advantages of certain embodiments will be more readily appreciated when considered in conjunction with the accompanying figures. The figures are not to be construed as limiting any of the preferred embodiments.

DETAILED DESCRIPTION

Figure 1:
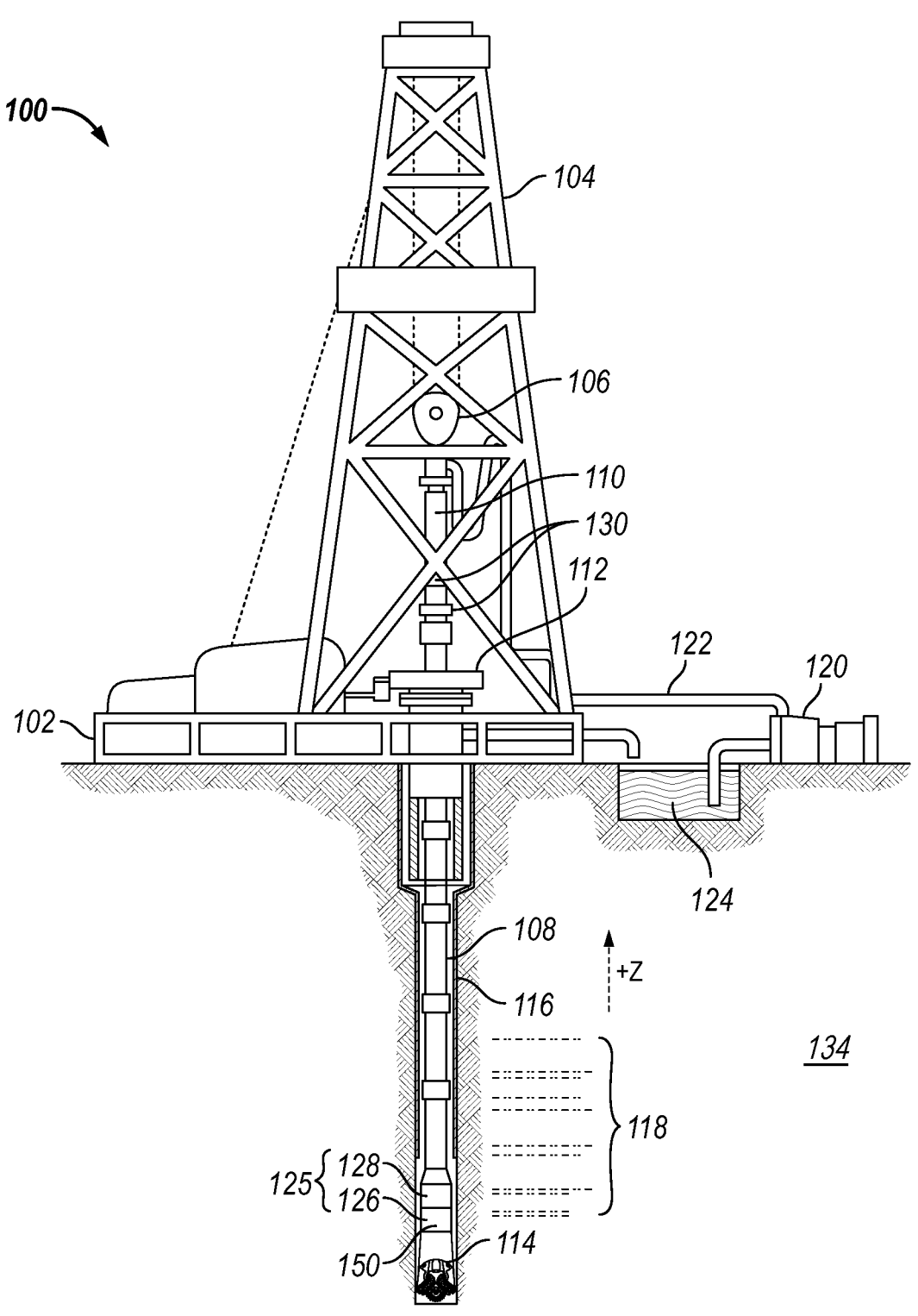
FIG. 1 shows an illustrative logging while drilling (LWD) environment.

This disclosure may generally relate to apparatuses, systems and methods for producing deep formation evaluations using logging while drilling ("LWD") tools with multiple subs. In other examples, this disclosure may relate to apparatuses, systems, and/or methods for producing deep formation evaluations using wireline logging having multiple subs.

Embodiments of the present disclosure relate to systems and techniques for performing and utilizing a knowledge-based inversion to detect subterranean fractures ahead of the progression of a wellbore. In some examples, an electromagnetic resistivity tool may be configured to measure various properties of an underground formation (e.g., formation properties) during a drilling operation for the exploration and/or production of hydrocarbon deposits from a reservoir within the formation. In further examples, the formation properties may include aspects related to the subterranean fluids and/or lithology. In further examples, the measurements from an electromagnetic resistivity tool may be utilized to identify natural or man-made fractures in undrilled portions of the subterranean formation ahead of the drill bit. However, it should be noted that embodiments are not intended to be limited thereto and that the disclosed embodiments may be applied to other types of measurement tools utilized to assess the subterranean formation (e.g., acoustic or ultrasonic tools). Further, it should be noted that such tools may be used to measure other types of formation properties, e.g., permeability, permittivity, etc.

Generally, in real formations, a resistivity of the formation varies in different directions, for example, a formation resistivity may vary in the x, y, and z coordinates. In electrically anisotropic formations, the anisotropy may be attributable to extremely fine layering during the sedimentary buildup of the formation. A formation Cartesian coordinate system may be oriented such that the x-y plane is parallel to the formation layers and the z axis is perpendicular to the formation layers. Resistivities measured in the x and y directions (e.g., $R_x$ and $R_y$, respectively), may tend to be more similar relative to resistivity measured in the x direction (e.g., $R_z$). The resistivity in a direction parallel to the formation plane (i.e., the x-y plane) may be referred to as the horizontal resistivity, $R_h$, and the resistivity in the direction perpendicular to the plane of the formation (i.e., the z direction) may be referred to the vertical resistivity, $R_v$. Due to the geological processes which deposit and form lithified sedimentary depositions, it may be more common to see gradational lithological changes rather than abrupt lithological changes. Likewise, these changes may be reflected in the responses measured from a formation evaluation tool, such as an electromagnetic resistivity tool.

The raw measurements acquired with an electromagnetic resistivity tool (e.g., apparent resistivity) may be challenging to evaluate and/or interpret without the application of an inversion. An inversion may be a mathematical or statistical technique which incorporates forward modeling to recover plausible physical formation properties from raw measurements collected by a formation evaluation tool. Prior knowledge related to the formation in which the measurements were acquired may be incorporated into the forward modelling process in order to place boundaries around the potential interpretations (e.g., solutions) on which the forward model may converge. Additionally, the prior knowledge about the formation may create a range of potential inversion assumptions where any particular assumption in the range of assumptions may be associated with different statistical likelihoods of occurrence. As a result, an inversion may create a multitude of interpretations which may further be ranked according to statistical likelihood of occurrence. Due to the statistical and iterative nature of an inversion calculation, dramatic departures or abrupt changes in the raw measurements (e.g., inputs to the inversion) collected by a formation evaluation tool (e.g., electromagnetic resistivity tool) may create unstable inversion solutions. While these abrupt changes may corrupt or obfuscate the formation properties in the geospatial vicinity where the data was collected, they may additionally indicate geologic discontinuities such as natural or man-made fractures and faults.

The disclosed apparatuses, systems and methods may be best understood in the context of the larger systems in which they operate. FIG. 1 illustrates a diagrammatic view of an exemplary logging while drilling (LWD) and/or measurement while drilling (MWD) wellbore operating environment 100 in which the present disclosure may be implemented. As depicted in FIG. 1, drilling platform 102 is equipped with a derrick 104 that supports a hoist 106 for raising and lowering a drill string 108. Hoist 106 suspends a top drive 110 suitable for rotating the drill string 108 and lowering the drill string 108 through the well head 112. Connected to the lower end of the drill string 108 is drill bit 114. As drill bit 114 rotates, drill bit 114 creates a wellbore 116 that passes through various formations 118 within subterranean formation 134. A pump 120 circulates drilling fluid through a supply pipe 122 to top drive 110, down through the interior of drill string 108, through orifices in drill bit 114, back to the surface via the annulus around drill string 108, and into a retention pit 124. The drilling fluid transports cuttings from the wellbore 116 into the pit 124 and aids in maintaining the integrity of the wellbore 116. Various materials can be used for drilling fluid, including oil-based fluids and water-based fluids.

As depicted in FIG. 1, logging tools 126 are integrated into the bottom-hole assembly 125 near drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub 128 to transfer measurement data to a surface receiver 130 and to receive commands from the surface. In some embodiments, the telemetry sub 128 communicates with a surface receiver 130 using mud pulse telemetry. In other cases, the telemetry sub 128 does not communicate with the surface, but rather stores logging data for later retrieval at the surface when the logging assembly is recovered. Notably, one or more of the bottom-hole assembly 125, the logging tools 126, and the telemetry sub 128 may also operate using a non-conductive cable (e.g., slickline, etc.) with a local power supply, such as batteries and the like. When employing non-conductive cable, communication may be supported using, for example, wireless protocols (e.g., EM, acoustic, etc.) and/or measurements and logging data may be stored in local memory for subsequent retrieval at the surface, as is appreciated by those skilled in the art.

Each of the logging tools 126 may include a plurality of tool components, spaced apart from each other, and communicatively coupled with one or more wires. Logging tools 126 may include tools such as the one shown in FIG. 4 in order to perform resistivity, or conductivity logging. The telemetry sub 128 may include wireless telemetry or logging capabilities, or both, such as to transmit or later provide information indicative of received energy/waveforms to operators on the surface or for later access and data processing for the evaluation of formation 118 properties.

The logging tools 126, including the resistivity logging tool, may also include one or more computing device 150 communicatively coupled with one or more of the plurality of tool components. Computing device 150 may comprise components such as processors, memory, input/output devices, interfaces, and the like. Computing device 150 may be configured to control or monitor the performance of the tools 126, process logging data, and/or carry out the methods of the present disclosure.

In some embodiments, one or more of the logging tools 126 may communicate with a surface receiver 130, such as a wired drill pipe. In other cases, one or more of the logging tools 126 may communicate with a surface receiver 130 by wireless signal transmission. In at least some cases, one or more of the logging tools 126 may receive electrical power from a wire that extends to the surface, including wires extending through a wired drill pipe. In at least some instances the methods and techniques of the present disclosure may be performed by a computing device (not shown) on the surface. In some embodiments, the computing device may be included in surface receiver 130. For example, surface receiver 130 of wellbore operating environment 100 at the surface may include one or more of wireless telemetry, processor circuitry, or memory facilities, such as to support substantially real-time processing of data received from one or more of the logging tools 126. In some embodiments, data is processed at some time subsequent to its collection, wherein the data may be stored on the surface at surface receiver 130, stored downhole in telemetry sub 128, or both, until it is retrieved for processing.

Figure 2:
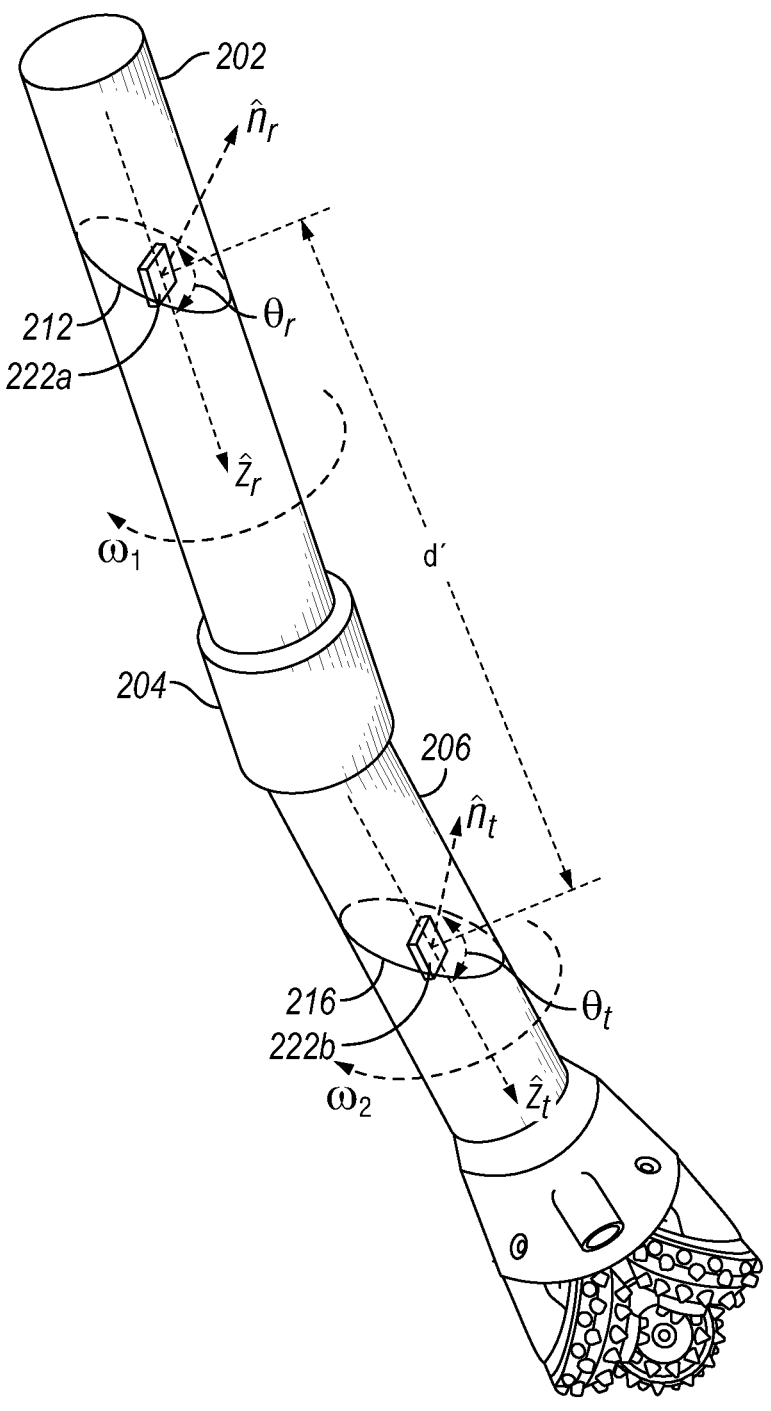
FIG. 2 shows an illustrative drill string with two logging tool modules.

FIG. 2 shows an illustrative example of a deep formation evaluation logging tool that includes two LWD tool modules 202 and 206 at different locations and orientations along drill string 108 (e.g., referring to FIG. 1). In the example shown, a resistivity logging tool receiver antenna 212 and a corresponding receive antenna position measurement device 222a may be housed within LWD tool module 202, while a resistivity logging tool transmit antenna 216 and a corresponding transmit antenna position measurement device 222b (components of an "at bit" instrument) are housed within LWD tool module 206. The position measurement devices may locate the position of each corresponding antenna, which may be expressed, for example, in terms of each antenna's tilt angle ($\theta_r$ and $\theta_t$ relative to the $z_r$ and $z_t$ axes respectively; generally fixed and known), each antenna's azimuthal angle ($\alpha_r$ and $\alpha_t$ relative to the x axis), each LWD tool module's inclination angle ($\varphi_r$ and $\varphi_t$) and the distance d' between the antennas. Various methods may be used to locate the antenna positions (e.g., relative to a reference position on the surface), several of which are described in more detail below. It should be noted that although the bent sub angles are typically less than five degrees, the figures show much more pronounced angles to better illustrate the effect of the angles on the relative spatial locations of the antennas, described in more detail below.

The above-described antenna and LWD tool module orientations may be used to calibrate tool responses prior to performing an inversion process to model the surrounding formation. For example, transmitter sub, to be discussed, may transmit an electromagnetic wave into a subterranean formation 134. The transmitted electromagnetic wave may interact with subterranean formation 134 (e.g., referring to FIG. 1) yielding a response signal based at least on the interaction between subterranean formation 134 and the transmitted electromagnetic wave. The response signal may be recorded with a resistivity logging tool receiver antenna 212 and a corresponding receive antenna position measurement device 222a. In examples, the response signal may comprise a plurality of response signals wherein the plurality of response signals from two or more depths. Such calibration is performed in order to be able to compare the modeled and measure results, as the modeled results assume known and fixed orientations and spatial locations of the resistivity logging tool transmit and receive antennas relative to each other, but the measured results may originate from antennas with any of a number of different relative orientations and spatial locations other than those presumed in the model. Measured and modeled results may be in the form of complex voltages, complex currents, resistivity values derived from measured/modeled voltages and/or currents, and/or ratios of voltages, currents and/or resistivities, just to name a few examples. Part of this calibration can be performed mathematically as one or more matrix rotations, while another part may be performed as a derivation of the relative spatial locations of and/or distance between antennas based on the antennas' locations and orientations. The resulting calibrated response is provided to the inversion, which uses these inputs to model the formation.

Equation (1), expressed more simply in equation (2), illustrates the rotation portion of the calibration process, taking into account each of the above-described angles:

$$V_R^T(t_0) = \tag{1}$$

$$\begin{bmatrix} \sin(\theta_t + \mathcal{O}_t(t_0))\cos(\propto_t (t_0)) \\ \sin(\theta_t + \mathcal{O}_t(t_0))\sin(\propto (t_0)) \\ \cos(\theta_t + \mathcal{O}_f(t_0)) \end{bmatrix}^T \begin{bmatrix} V_x^x(t_0) & V_y^x(t_0) & V_z^x(t_0) \\ V_x^y(t_0) & V_y^y(t_0) & V_z^y(t_0) \\ V_x^Z(t_0) & V_y^z(t_0) & V_z^z(t_0) \end{bmatrix}$$

$$\begin{bmatrix} \sin(\theta_r + \mathcal{O}_t(t_0))\cos(\propto_r (t_0)) \\ \sin(\theta_r + \mathcal{O}_r(t_0))\sin(\propto_r (t_0)) \\ \cos(\theta_r + \mathcal{O}_r(t_0)) \end{bmatrix}$$

$$V_R^T(t_0) = T_{VECTOR}^T(t_0) * V_{MATRIX}(t_0) * R_{VECTOR}(t_0) \tag{2}$$

where $$T_{VECTOR}^T(t_0)$$

(shown in transposed form for convenience) is given by the transmit antenna's known tilt angle $\theta_t$, and by the inclination angle $\mathcal{O}_t$ and azimuthal angle $\propto_t$ as determined by the transmit antenna's position measurement device at time $t_0$; $R_{VECTOR}(t_0)$ is given by the receive antenna's known tilt angle $\theta_r$, and by the inclination angle $\mathcal{O}_r$ azimuthal angle $\propto_r$ as determined by the receive antenna's position measurement device at time $t_0$; and $V_{MATRIX}(t_0)$ is a 3×3 voltage matrix consisting of nine components $V_j^i$. Each component represents a theoretical voltage a receive antenna with a j axis orientation (x, y or z) in response to a signal from a transmit antenna with an i axis orientation (also x, y or z) for a given formation model, operating frequency and spacing d'.

Another part of the calibration may involve determining the distance between the transmit antenna and the receive antenna. The distance between transmit and receive antennas changes when two or more LWD tool modules are positioned such that they no longer share a common z axis. For example, in FIG. 2 both LWD tool modules 202 and 206 are inclined such that each z axis ($z_r$ and $z_t$) is inclined at a different inclination angle $\phi$ ($\phi_r$ and $\phi_t$) relative to a vertical reference z axis. The inclination angle change reduces the original distance between the receive and transmit antennas 212 and 216 from original distance d when drill string 108 (e.g., referring to FIG. 1) was straight (bent sub 204 set to 0 degrees) to distance d'.

As a further complication to measuring formation resistivity, boreholes are generally perpendicular to formation beds. The angle between the axis of the well bore and the orientation of the formation beds (as represented by the normal vector) has two components. These components are the dip angle and the azimuth angle. The dip angle is the angle between the borehole axis and the normal vector for the formation bed. The azimuth angle is the direction in which the borehole's axis "leans away from" the normal vector. Electromagnetic resistivity logging measurements are a complex function of formation resistivity, formation anisotropy, and the formation dip and azimuth angles, which may all be unknown. A triaxial induction well logging tool may be used to detect formation properties such as resistivity anisotropy, which is one of the important parameters in evaluation subterranean formations such as sand-shale reservoirs or fractured reservoirs. However, the resistivity anisotropy parameter cannot be obtained without performing a numerical inversion process. Specifically, numerical inversion may be utilized to obtain accurate formation resistivity anisotropy parameters. The log inversion utilized for anisotropy determination may involve a large number of inversion parameters to be determined by an algorithm referred to as the one-dimensional (1D) vertical inversion. Generally, this algorithm may utilize large amounts of processing time and be sensitive to noise from logging, the logging environment characteristics and borehole correction, which could result in errors in the inverted vertical resistivity.

Figure 3:
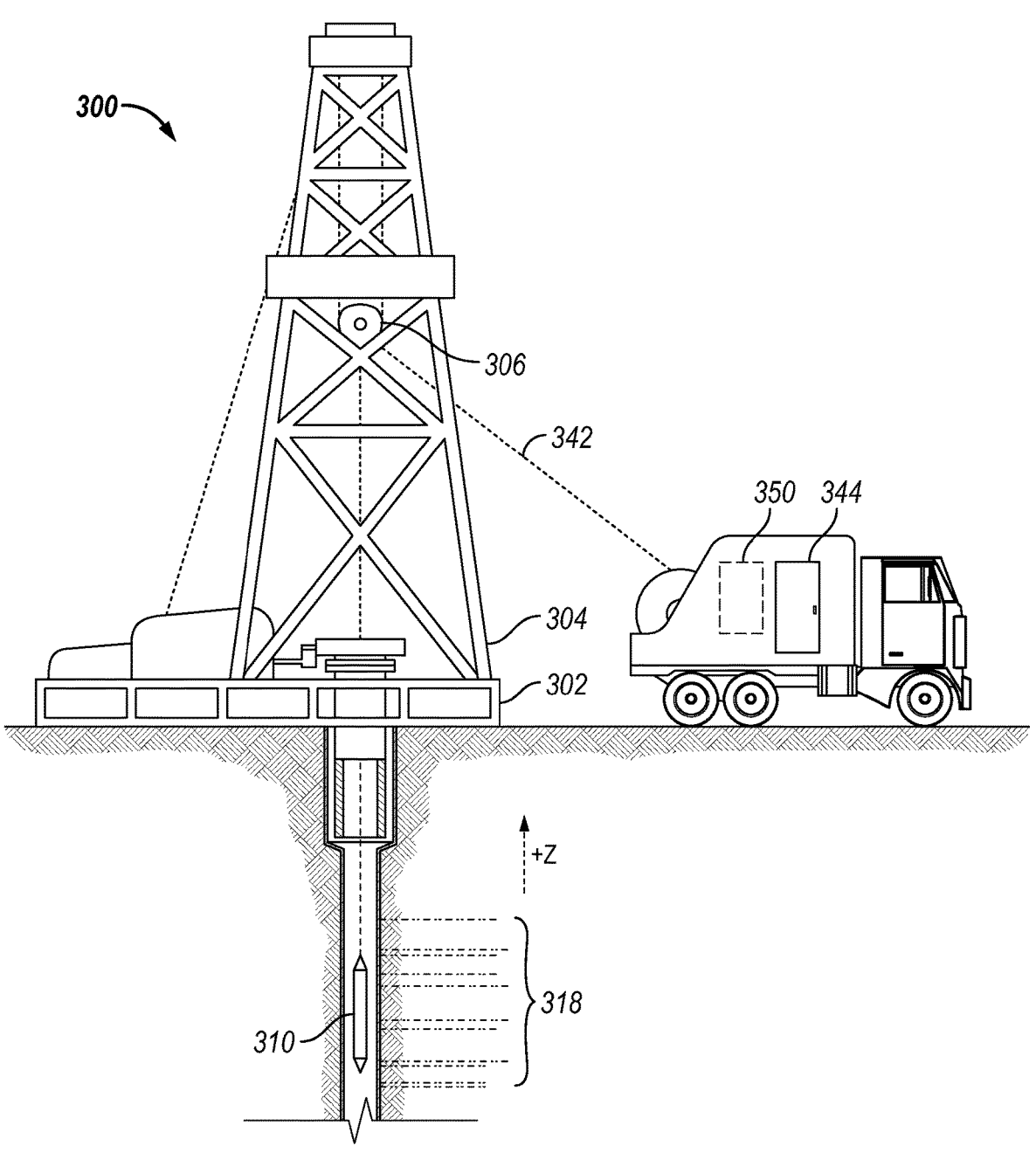
FIG. 3 shows an illustrative logging tool and a surface system.

FIG. 3 illustrates a diagrammatic view of a conveyance logging wellbore operating environment 300 in which the present disclosure may be implemented. As depicted in FIG. 3, hoist 306 may be included as a portion of platform 302, such as that coupled to derrick 304, and used with a conveyance 342 to raise or lower equipment such as resistivity logging tool 310 into or out of a borehole. Resistivity logging tool 310 may include, for example, tools such as the one shown in FIG. 4. A conveyance 342 may provide a communicative coupling between the resistivity logging tool 310 and a logging facility 344 at the surface. The conveyance 342 may include wires (one or more wires), slicklines, cables, or the like, as well as tubular conveyances such as coiled tubing, joint tubing, or other tubulars, and may include a downhole tractor. Additionally, power can be supplied via conveyance 342 to power the tool. The resistivity logging tool 310 may have a local power supply, such as batteries, downhole generator and the like. When employing non-conductive cable, coiled tubing, pipe string, or downhole tractor, communication may be supported using, for example, wireless protocols (e.g., EM, acoustic, etc.), and/or measurements and logging data may be stored in local memory for subsequent retrieval. The logging facility 344 may include a computing device 350 capable of carrying out the methods and techniques of the present disclosure. In this manner, information about the formation 318 may be obtained by resistivity logging tool 310 and processed by a computing device, such as computing device 350. In some embodiments, computing device 350 is equipped to process the received information in substantially real-time, while in some embodiments, computing device 350 can be equipped to store the received information for processing at some subsequent time.

Figure 4:
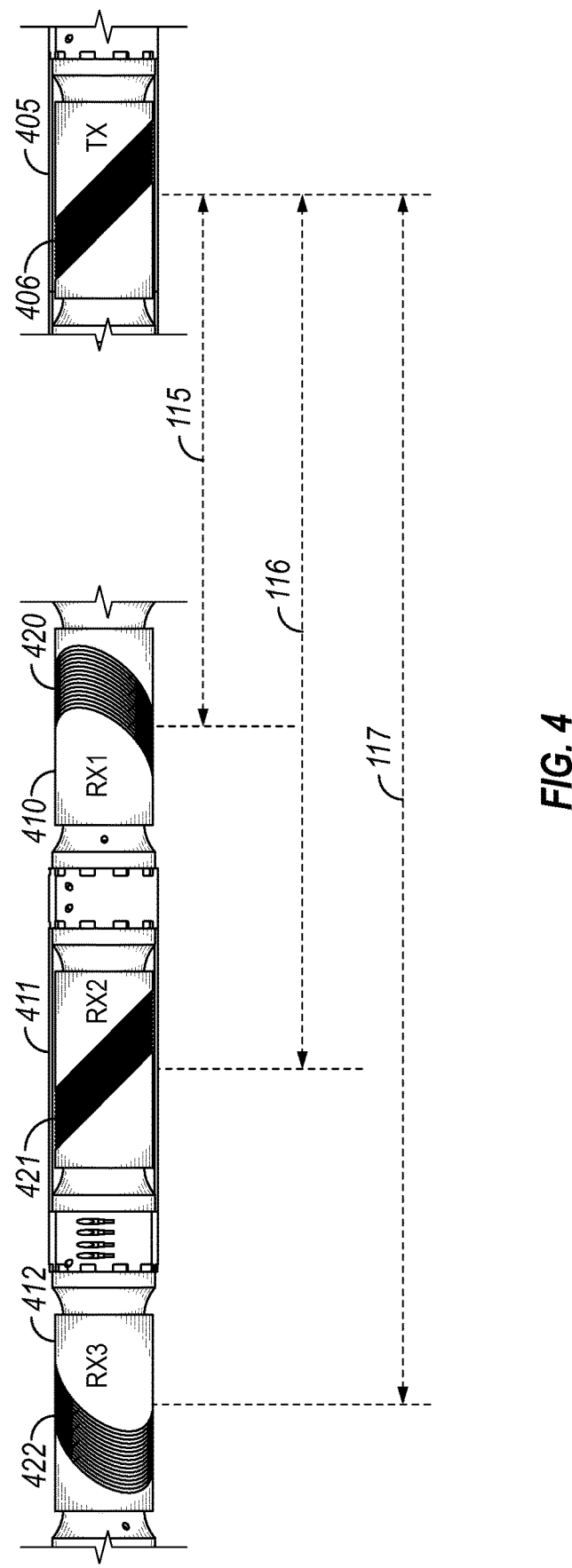
FIG. 4 shows an illustrative logging tool.

FIG. 4 illustrates an example wellbore tool 400 that may be used in the systems and methods described herein. Wellbore tool 400 may comprise transmitter sub 405 and one or more receiver subs 410, 411, and 412. In some examples, transmitter sub 405 may be referred to as TX and receiver subs 410, 411, and 412 may be referred to as RX1, RX2, and RX3 respectively. Transmitter sub 405 may comprise a transmitter coil 406 which may be an electromagnetic wave source such as a monopole, dipole, quadrupole, or other higher order wave source. Each of the receiver subs 410, 411, and 412 may comprise three or more receiver coils per sub configured to receive an electromagnetic wave from transmitter sub 405. Receiver subs 410, 411, and 412 may be disposed on wellbore tool 400 a distance 115, 116, 117 from transmitter sub 105. Distance 115, 116, 117 may also be referred to as S1, S2, and S3 respectively.

The above-described antenna and LWD tool module orientations may be used to calibrate tool responses prior to performing an inversion process to model the surrounding formation. For example, receiver subs 410, 411, and 412 may transmit an electromagnetic wave into a subterranean formation 134. The transmitted electromagnetic wave may interact with subterranean formation 134 (e.g., referring to FIG. 1) yielding a response signal based at least on the interaction between subterranean formation 134 and the transmitted electromagnetic wave. The response signal may be recorded with a resistivity logging tool receiver antenna 212 (e.g., referring to FIG. 2) and a corresponding receive antenna position measurement device 222a. In examples, the response signal may comprise a plurality of response signals wherein the plurality of response signals from two or more depths.

Referring to FIG. 4 and FIG. 2, first receiver coils 420 are not co-axial with receiver sub 410. There may be an axial offset between first receiver coils 420 and a centerline of receiver sub 410 which may be notated as $\theta_{R1}$. Similarly, for transmitter coil 406, second receiver coils 421, and third receiver coils 422, there may be an axial offset of coils from a centerline of the respective subs notated as $\theta_T$, $\theta_{R2}$, and $\theta_{R3}$ respectively. In addition to axial offset, each of the first receiver coils 420, second receiver coils 421, and third receiver coils 422 may have an azimuthal offset relative to transmitter coil 406. The tilt angle of the transmitter coil is notated as $\theta_T$ and the tilt angle, or azimuthal offset, of each of the receiver coils is notated as $\theta_{R1}$, $\theta_{R2}$, and $\theta_{R3}$ for RX1, RX2, and RX3 respectively. The azimuth angle is dependent on wellbore tool's 400 rotated position in wellbore 116 (e.g., referring to FIG. 1). In examples, although not illustrated, $\beta_{off}$ is the difference in azimuthal angle between the transmitter coil and the second receiver coil which may be measured before the tool is inserted into wellbore 116. Further, $\beta_{A1}$ is the difference in azimuthal angle between the first receiver coil 420 and the second receiver coil 421 and $\beta_{A2}$ is the difference in azimuthal angle between the third receiver coil 422 and second receiver coil 420. In examples, variables $\beta_{A1}$ and $\beta_{A2}$ may take any value but may meet the following formulas: (1) $\beta_{A1} \neq \beta_{A2}$, (2) $\beta_{A1} \neq 0°$, and (3) $\beta_{A2} \neq 0°$.

Figure 5:
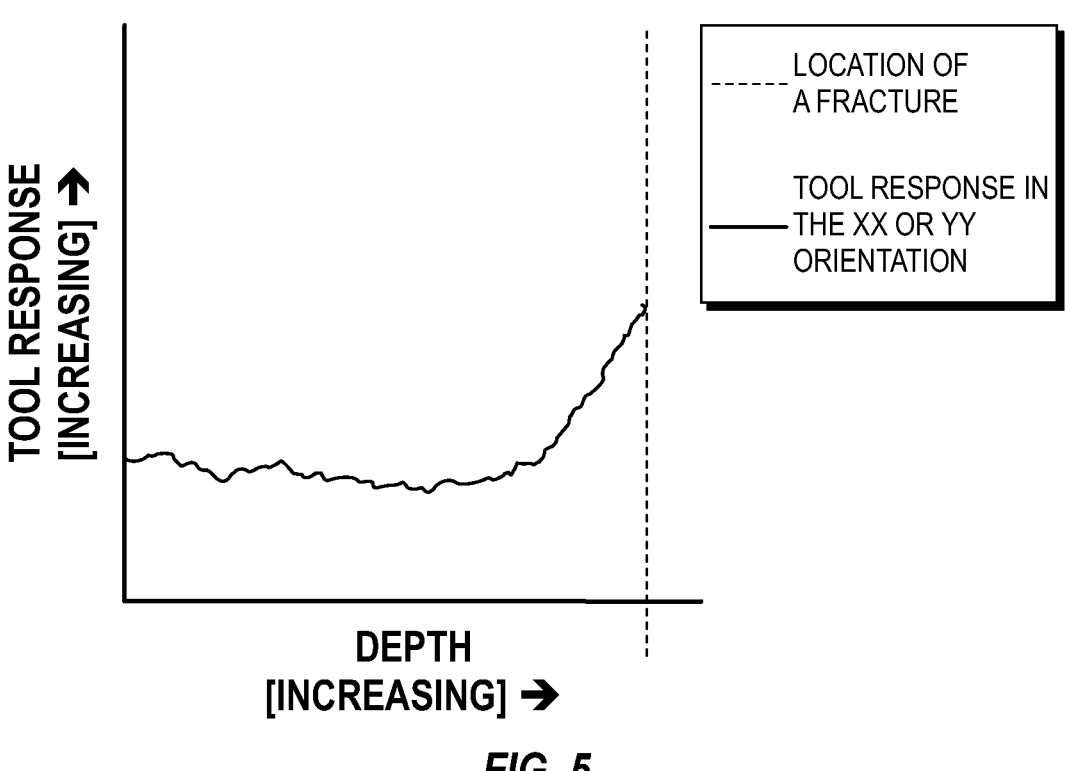
FIG. 5 shows a tool response in one orientation (e.g., XX or YY) as a function of depth.

In some examples, the gradient change of raw measurements in the x-direction or y-direction in comparison to the z-direction may be used to identify a deviation in formation properties such as a fault. FIG. 5 may depict a resistivity plot in a single orientation which may be used to identify a deviation in formation properties ahead of wellbore 116. The deviation in formation properties may include a fracture or fault. FIG. 5 may further depict an electromagnetic response of XX or YY coupling components. The XX coupling component refers to an X-oriented receiver measuring the magnetic field in relation to an X-oriented transmitter operating at a specific frequency (or multiple frequencies). Both the transmitter and the receiver are located at the same BHA with a specific separation between them. With the design of tilted antennas in FIG. 4, the XX, YY and ZZ components can be derived from the nine-component matrix in Equation (1) based on multiple receivers having different azimuthal orientations (RX1, RX2, and RX3). The X direction may be defined by high-side or magnetic north in the LWD system. The Z direction may be the direction of the well trajectory. Further, ZZ measurement may be referred to as z-oriented receiver measurements with respect to the z-oriented transmitter firing. The Y direction may be a direction normal to the X and Z directions. Further, YY measurement may be referred to as y-oriented receiver measurements with respect to the y-oriented transmitter firing. While taking measurements at various depths along the wellbore, the tool acquires continuous responses of XX, YY, and ZZ components in relation to different measured depth ("MD") position of the wellbore. Therefore, one can also calculate a gradient response of XX component along the MD direction, given by (XX(MD1)−XX(MD2)/(MD1−MD2)). Where, MD1 and MD2 are two different MD positions along the wellbore, and XX(MD1) is the XX component taken at the MD1 position and XX(MD2) is the XX component taken at the MD2 position. This presents the XX component change in relation to the formation properties change at different MD positions. Similarly, gradient responses of YY and ZZ can be calculated using the same formula.

In some examples the wellbore depth may be measured in total vertical depth ("TVD") or in MD. As the resistivity tool approaches a portion of the subterranean formation with different formation properties, such as a fracture, measurements of XX or YY component may show a deviation from the previously acquired measurements. In some examples, measurements of XX or YY component may be more sensitive to changes in formation properties located ahead of the tool while measurements of ZZ component may be less sensitive. In further examples, measurements of XX component may be more sensitive to changes ahead of the wellbore than changes in the YY component. However, in some formations, changes of the YY component may be more sensitive than changes of the XX component. In some examples, measurements of the XX or YY component may be able to detect a fracture located at further distances away from the tool than measurements of ZZ component. For example, if the measurements in either the XX or YY component deviate from a given threshold, it may indicate the presence of a fracture or fault. Wellbore tool's 400 (e.g., referring to FIG. 4) response in FIG. 5 depicts a deviation from the previous responses as wellbore tool 400 approaches the depth of the fracture. This deviation may indicate that wellbore tool 400 is approaching a fracture before the wellbore is extended through the fracture. If a potential fracture is detected, it may be desirable to modify the trajectory of the wellbore in order to steer the drilling assembly around the fracture.

Figure 6:
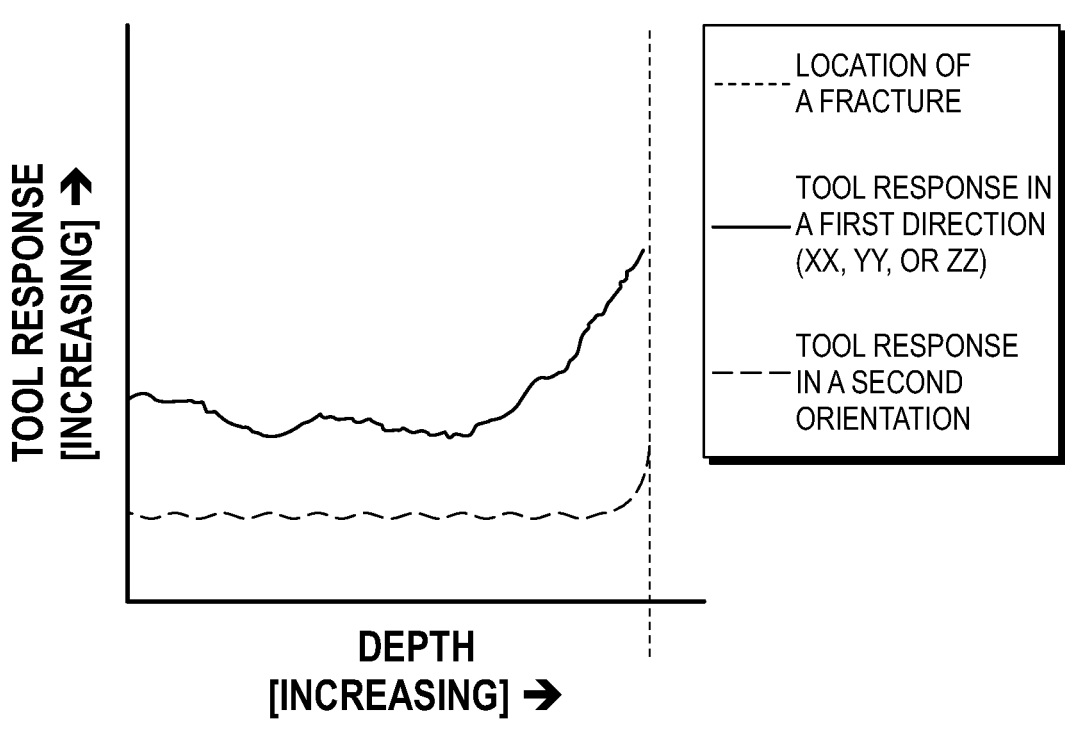
FIG. 6 shows a tool response in two orientations as a function of depth.

FIG. 6 may depict the comparison of resistivity values acquired in two components relative to the wellbore depth. For example, the y-axis of FIG. 6 may depict the tool response while the x-axis depicts a wellbore depth in TVD or MD. The data plotted in FIG. 6 may include responses from wellbore tool 400 from two different components which may be used to compare the responses from the two components. The comparison may include sequential measurement difference between XX and YY, XX and ZZ, or YY and ZZ as a function of wellbore depth. In further examples, the comparison may use measurements taken at different frequencies or different spacings between the transmitter and receiver (multi-frequency variation or multi-spacing variation). As previously mentioned, measurements of the XX or YY component may be more sensitive to changes in formation properties located ahead of wellbore tool 400 than measurements of ZZ component. In some examples, measurements of XX or YY component may be able to detect a fracture located at further distances away from the tool than measurements of ZZ component. Additionally, measurements of the XX component may be more or less sensitive than measurements of the YY component. Comparing the changes in the resistivity responses from two orientations may highlight the presence of a fracture or fault ahead of wellbore 116 (e.g., referring to FIG. 1). If a potential fracture is detected, it may be desirable to modify the trajectory of wellbore 116 in order to steer the drilling assembly around the fracture.

Figure 7A:
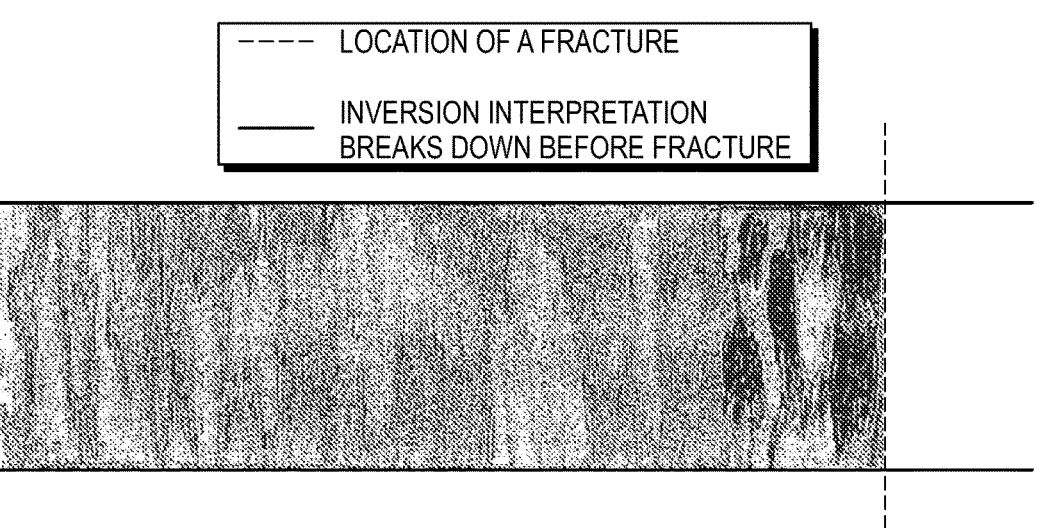
FIGS. 7A and 7B show an inversion interpretation before a fracture.
Figure 7B:
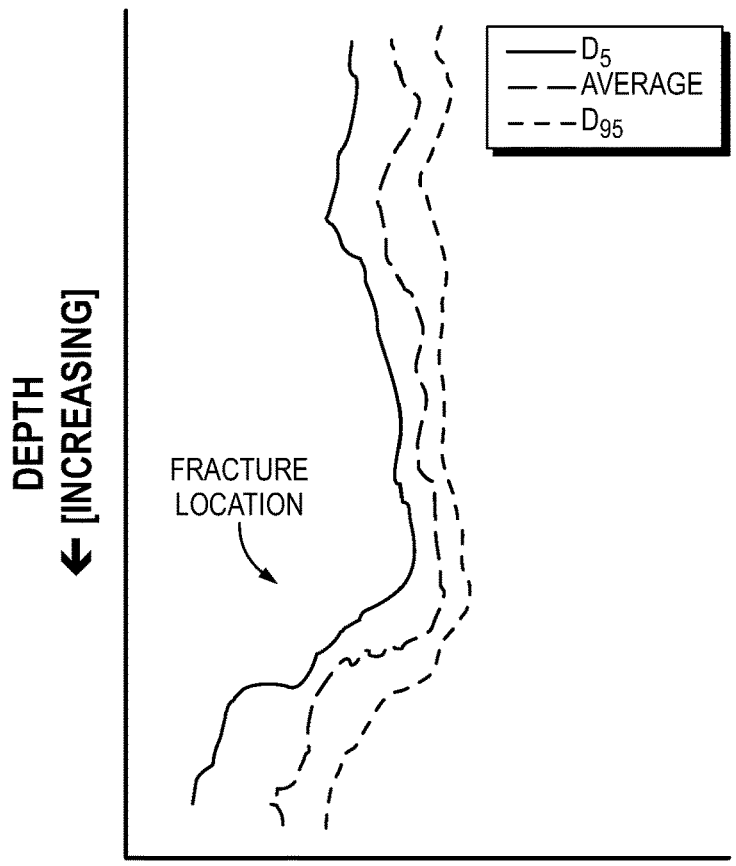

In some examples the inversion results created from the tool responses may be assessed to predict the presence of a fault or fracture ahead of drill bit 114 (e.g., referring to FIG. 1). FIGS. 7A and 7B may depict an inversion interpretation which indicates the presence of a fracture ahead of wellbore 116. As previously mentioned, an inversion may be a mathematical or statistical technique which incorporates forward modeling to recover plausible physical formation properties from raw measurements collected by a formation evaluation tool. Prior knowledge related to the formation in which the measurements were acquired may be incorporated into the forward modelling process in order to place boundaries around the potential interpretations (e.g., solutions) on which the forward model may converge. Additionally, the prior knowledge about the formation may create a range of potential inversion assumptions where any particular assumption in the range of assumptions may be associated with different statistical likelihoods of occurrence. As such, an inversion may create a multitude of interpretations which may further be ranked according to their statistical likelihood of occurrence. As previously mentioned, the inversion results may become instable when abrupt geological changes are measured in the subterranean formation. As such, certain types of unstable or corrupted inversion results may indicate the presence of a fault or fracture. Additionally, any permutation (e.g., related to the statistical likelihood for the range of inversion solutions) of the inversion results may be used to assess the presence of a fault or fracture. For example, the inversion utilized may consider the average inversion result, or the inversion result created according to any range of probability distributions (e.g., Di, where i=1 to 100). In further examples, the average inversion result may be synonymous with the D50 inversion result. FIG. 7A may be generated from the same resistivity responses as those depicted in FIG. 7B. As depicted in FIG. 7A, the inversion solution displays an erratic response in the vicinity of a fracture. Likewise, FIG. 7B While FIG. 7B may depict resistivity responses according to the D5, D50, and D95 inversion results, FIG. 7B could display any resistivity response ranging from any weighted combination of D1 to D100 including quartiles, weighted averages of any combination of values contained within D1 to D100 (e.g., including D1 and D100), or individual values within the range of D1 to D100 (e.g., including D1 and/or D100). As such, FIG. 7A could display the inversion result ranging from any weighted combination of D1 to D100 including quartiles, weighted averages of any combination of values contained within D1 to D100 (e.g., including D1 and D100), or individual values within the range of D1 to D100 (e.g., including D1 and/or D100).

Figure 8A:
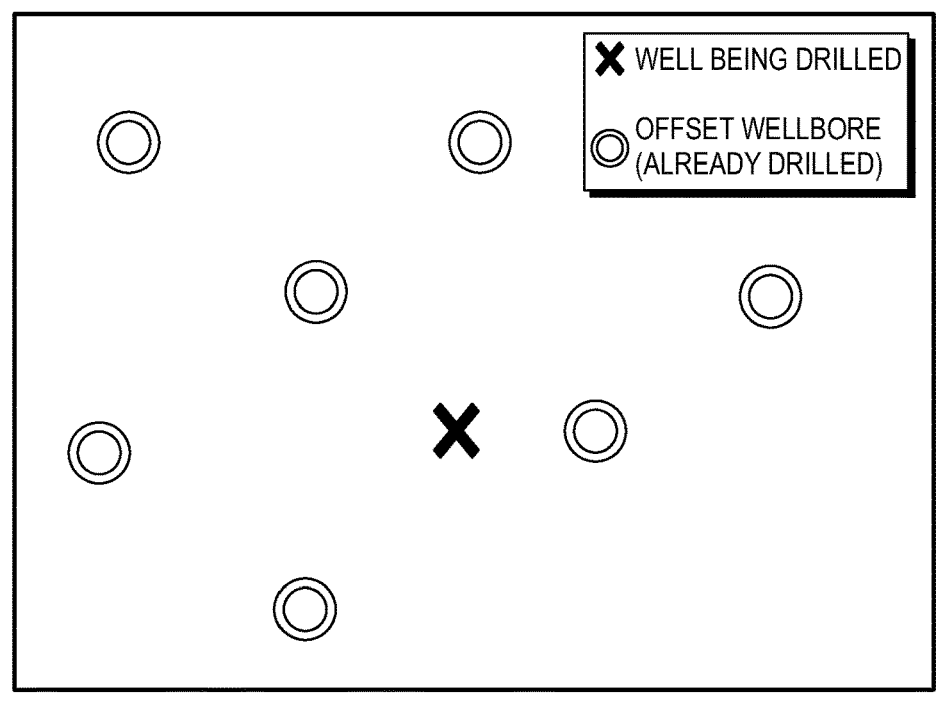
FIGS. 8A and 8B show a comparison of resistivities measured between an active well and an offset well.
Figure 8B:
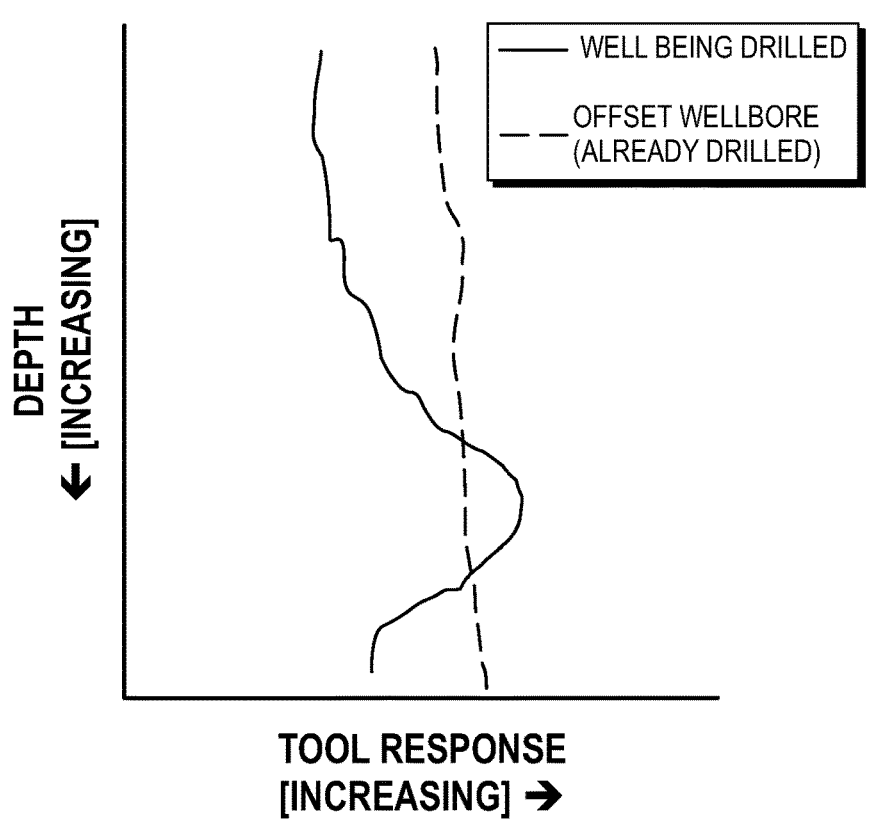

In some examples, data collected from offset wells may be compared against data gathered as a well is being drilled to identify differences which may indicate a fault or fracture. For example, geologic data, resistivity logs, inversion results, and formation interpretations from previously drilled wells may be compared against data gathered in a well that is being drilled. FIG. 8A depicts an aerial view of a portion of land which contains previously drilled wells and a well that is currently being drilled. The previously drilled wells may be referred to as offset wells with respect to the well that is currently being drilled. In some examples, offset wells may transect subterranean formations which a well that is currently being drilled has either transected or may be planned to transect. As such, geological analysis and formation properties identified in offset wells may provide insight to the current drilling operation. Two example wells denoted as Well A and Well B may be depicted in FIG. 8A. Well A may denote the well currently being drilled while Well B denotes a previously drilled offset well. FIG. 8B may depict the depth-aligned tool responses for Well A and Well B. In some examples, departures from previously acquired data from wells in the vicinity of the well being drilled may additionally indicate the presence of a fault or fracture. As depicted in FIG. 8B, the measurements acquired from Well A depict a difference in readings from the measurements acquired for Well B. In some examples, this difference may indicate the presence of a fault or fracture. The comparison may utilize any of the previously mentioned tool responses including raw measurements and inversion results determined from any weighted combination of D1 to D100 including quartiles, weighted averages of any combination of values contained within D1 to D100 (e.g., including D1 and D100), or individual values within the range of D1 to D100 (e.g., including D1 and/or D100).

In some examples, a smoothing methodology referred to as "enhanced structure image," (or "ESI"), may be applied to the inversion results to smooth out any discontinuities. In further examples, ESI may be utilized to reinforce the horizontal continuity of the inversion interpretation. For example, an inversion interpretation which incorporates ESI may appear smoother than an inversion without ESI, which would appear more pixelated. Comparing the inversion result with and without ESI may highlight outliers that exist between the two interpretations which may further help with identifying potential faults and/or fractures. In some examples, the inversion results created in any of the foregoing methodologies may be rendered as a 2-dimensional or 3-dimensional inversion to identify potential faults and/or fractures.

Discussed above are methods and systems for improving current technology. Specifically, improving the quality of electrical images that may be used to determine formation properties. Current problems faced by imaging tools reduce and degrade electrical images. Poor quality electrical images make drilling operations and/or production operations difficult. Operators may make improper decisions based off low quality images. This may extend drilling time, increase costs, reduce production, and/or negatively affect a well. There is a need to produce high quality electrical images that are reliable.

Accordingly, this disclosure describes apparatus and methods that may relate to subterranean operations. The apparatus, methods, and compositions may further be characterized by one or more of the following statements:

Statement 1. A method comprising: disposing a bottom hole assembly into a wellbore, wherein the bottom hole assembly comprises: a transmitter sub comprising a transmitter coil; a first receiver sub comprising a first receiver coil; generating an electromagnetic wave at the transmitter coil; transmitting an electromagnetic wave into a subterranean formation with the transmitter coil; receiving a plurality of response signals with the first receiver coil, wherein the plurality of response signals are from two or more depths and are formed from the electromagnetic wave interacting with the subterranean formation; and analyzing a gradient of the response signals to determine if the gradient exceeds a threshold, wherein the threshold indicates a presence of a fracture or fault.

Statement 2. The method of statement 1, wherein the gradient of the response signal is a gradient of XX or YY component along an MD direction.

Statement 3. The method of statement 2, further comprising determining a change of formation ahead of a drill bit compared to a gradient of ZZ component along the MD direction.

Statement 4. The method of statements 1-3, wherein analyzing further comprises processing a gradient of a response difference between XX and ZZ components, the response difference between YY and ZZ components to determine formation resistivity variation ahead of a drill bit.

Statement 5. The method of statement 4, further comprising generating multi-frequency variation or multi-spacing variation in the response signal.

Statement 6. The method of statements 4 or 5, wherein measurements of the XX component or the YY component are more sensitive to changes in formation properties located ahead of the bottom hole assembly than measurements of the ZZ component.

Statement 7. The method of statement 6, wherein analyzing a gradient of the response signals is determined by the XX component or the YY component.

Statement 8. The method of statements 4-7, wherein measurements of the YY component or the ZZ component are more sensitive to changes in formation properties located ahead of the bottom hole assembly than measurements of the XX component.

Statement 9. The method of statements 4-8, wherein measurements of the XX component or the ZZ component are more sensitive to changes in formation properties located ahead of the bottom hole assembly than measurements of the YY component. The method of claim 4, wherein measurements of the XX component or the ZZ component are more sensitive to changes in formation properties located ahead of the bottom hole assembly than measurements of the YY component.

Statement 10. The method of statements 4-9, wherein the fracture or fault is 2-dimensional or 3-dimensional.

Statement 11. A system comprising: a bottom hole assembly into a wellbore, wherein the bottom hole assembly comprises: a transmitter sub comprising a transmitter coil configured to generate an electromagnetic wave into a subterranean formation; and a first receiver sub comprising a first receiver coil configured to receive a plurality of response signals with the first receiver coil, wherein the plurality of response signals are from two or more depths and are formed from the electromagnetic wave interacting with the subterranean formation; and an information handling system communicably coupled to the bottom hole assembly configured to analyze a gradient of the response signals to determine if the gradient exceeds a threshold, wherein the threshold indicates a presence of a fracture or fault.

Statement 12. The system of statement 11, wherein the gradient of the response signal is a gradient of XX or YY component along an MD direction.

Statement 13. The system of statement 12, wherein the information handling system is further configured to determine a change of formation ahead of the drill bit compared to a gradient of ZZ component along the MD direction.

Statement 14. The system of statements 11-13, wherein analyzing further comprises processing a gradient of the response difference between XX and ZZ components, the response difference between YY and ZZ components to determine formation resistivity variation ahead of a drill bit.

Statement 15. The system of statement 14, wherein the information handling system is further configured to generate multi-frequency variation or multi-spacing variation in the response signal.

Statement 16. The system of statements 14 or 15, wherein measurements of the XX component or the YY component are more sensitive to changes in formation properties located ahead of the bottom hole assembly than measurements of the ZZ component.

Statement 17. The system of statements 14-16, wherein analyzing a gradient of the response signals is determined by the XX component or the YY component.

Statement 18. The system of statements 14-17, wherein measurements of the YY component or the ZZ component are more sensitive to changes in formation properties located ahead of the bottom hole assembly than measurements of the XX component.

Statement 19. The system of statements 14-18, wherein measurements of the XX component or the ZZ component are more sensitive to changes in formation properties located ahead of the bottom hole assembly than measurements of the YY component. The method of claim 4, wherein measurements of the XX component or the ZZ component are more sensitive to changes in formation properties located ahead of the bottom hole assembly than measurements of the YY component.

Statement 20. The system of statements 14-20, wherein the fracture or fault is 2-dimensional or 3-dimensional.

The preceding description provides various examples of the wellbore tools and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

What is claimed is:

1. A method comprising:
disposing a bottom hole assembly into a wellbore, wherein the bottom hole assembly comprises:
a transmitter sub comprising a transmitter coil;
a first receiver sub comprising a first receiver coil;
transmitting an electromagnetic wave into a subterranean formation with the transmitter coil;
receiving a plurality of response signals with the first receiver coil from a direction comprising an x-direction, a y-direction, or a z-direction, wherein the plurality of response signals are from two or more depths and are formed from the electromagnetic wave interacting with the subterranean formation;
analyzing a gradient of the response signals, wherein the gradient of the response signals is indicative of formation resistivity in the direction and across the two or more depths;
detecting a change in the gradient of the response signals, wherein the change in the gradient of the response signals is indicative of a change in the formation resistivity in the direction; and
determining if the change in the gradient of the response signals exceeds a threshold, wherein the threshold indicates a presence of a fracture or a fault in the formation.

2. The method of claim 1, wherein the gradient of the response signal is a gradient of XX or YY component along a measured depth (MD) direction.

3. The method of claim 2, further comprising determining a change of formation ahead of a drill bit compared to a gradient of ZZ component along the MD direction.

4. The method of claim 1, wherein analyzing further comprises processing a gradient of a response difference between XX and ZZ components, the response difference between YY and ZZ components to determine formation resistivity variation ahead of a drill bit.

5. The method of claim 4, further comprising generating multi-frequency variation or multi-spacing variation in the response signal.

6. The method of claim 4, wherein measurements of the XX component or the YY component are more sensitive to changes in formation properties located ahead of the bottom hole assembly than measurements of the ZZ component.

7. The method of claim 6, wherein analyzing a gradient of the response signals is determined by the XX component or the YY component.

8. The method of claim 4, wherein measurements of the YY component or the ZZ component are more sensitive to changes in formation properties located ahead of the bottom hole assembly than measurements of the XX component.

9. The method of claim 4, wherein measurements of the XX component or the ZZ component are more sensitive to changes in formation properties located ahead of the bottom hole assembly than measurements of the YY component.

10. The method of claim 4, wherein the fracture or fault is 2-dimensional or 3-dimensional.

11. A system comprising:
a bottom hole assembly into a wellbore, wherein the bottom hole assembly comprises:
a transmitter sub comprising a transmitter coil configured to generate an electromagnetic wave into a subterranean formation; and
a first receiver sub comprising a first receiver coil configured to receive a plurality of response signals with the first receiver coil from a direction comprising an x-direction, a y-direction, or a z-direction, wherein the plurality of response signals are from two or more depths and are formed from the electromagnetic wave interacting with the subterranean formation; and
an information handling system communicably coupled to the bottom hole assembly configured to:
analyze a gradient of the response signals, wherein the gradient of the response signals is indicative of formation resistivity in the direction and across the two or more depths;
detect a change in the gradient of the response signals, wherein the change in the gradient of the response signals is indicative of a change in the formation resistivity in the direction; and
determine if the change in the gradient of the response signals exceeds a threshold, wherein the threshold indicates a presence of a fracture or a fault in the formation.

12. The system of claim 11, wherein the gradient of the response signal is a gradient of XX or YY component along a measured depth MD direction.

13. The system of claim 12, wherein the information handling system is further configured to determine a change of formation ahead of the drill bit compared to a gradient of ZZ component along the MD direction.

14. The system of claim 11, wherein analyzing further comprises processing a gradient of the response difference between XX and ZZ components, the response difference between YY and ZZ components to determine formation resistivity variation ahead of a drill bit.

15. The system of claim 14, wherein the information handling system is further configured to generate multi-frequency variation or multi-spacing variation in the response signal.

16. The system of claim 14, wherein measurements of the XX component or the YY component are more sensitive to changes in formation properties located ahead of the bottom hole assembly than measurements of the ZZ component.

17. The system of claim 16, wherein analyzing a gradient of the response signals is determined by the XX component or the YY component.

18. The system of claim 14, wherein measurements of the YY component or the ZZ component are more sensitive to changes in formation properties located ahead of the bottom hole assembly than measurements of the XX component.

19. The system of claim 14, wherein measurements of the XX component or the ZZ component are more sensitive to changes in formation properties located ahead of the bottom hole assembly than measurements of the YY component.

20. The system of claim 14, wherein the fracture or fault is 2-dimensional or 3-dimensional.

\* \* \* \* \*